United States Patent [19]

Hettinga et al.

[11] Patent Number: 5,380,186

[45] Date of Patent: Jan. 10, 1995

[54] FLOW REGULATING ASSEMBLY FOR A PLASTIC INJECTION MACHINE

[76] Inventors: Siebolt Hettinga; James K. Ober, both of 2123 NW. 111th St., Des Moines, Iowa 50325

[21] Appl. No.: 836,985

[22] Filed: Feb. 14, 1992

[51] Int. Cl.6 .............................................. B29C 45/02
[52] U.S. Cl. .................................. 425/557; 425/559; 425/561; 425/563
[58] Field of Search ............... 425/563, 564, 557, 559, 425/561, 562

[56] References Cited

U.S. PATENT DOCUMENTS

| | | | |
|---|---|---|---|
| 4,557,683 | 12/1985 | Meeker et al. | 425/562 |
| 4,643,665 | 2/1987 | Zeiger | 425/563 |

FOREIGN PATENT DOCUMENTS

| | | | |
|---|---|---|---|
| 15027 | 9/1962 | Japan | 425/562 |
| 7625 | 5/1964 | Japan | 425/557 |
| 2719497 | 11/1978 | Japan | 425/562 |

OTHER PUBLICATIONS

A. R. Morse, What Injection Molders Should Know About Reciprocating Screw-Tip Shutoffs, Aug. 1967.

Primary Examiner—Tim Heitbrink
Attorney, Agent, or Firm—Brian J. Laurenzo; Kent A. Herink; Brett J. Trout

[57] ABSTRACT

A flow regulating assembly for restricting plastic material from flowing directly from a central chamber of an injection piston to an accumulator cavity of a plastic injection machine and instead directing the plastic material towards the wall of the accumulator cavity thereby providing a scouring effect and reducing build-up of the plastic material on the wall of the accumulator cavity. The flow regulating assembly includes a valve member having a central opening located proximate to and in corresponding alignment with the central chamber of the injection piston and four branch passageways extended from the central opening of the valve member to external openings in a circumferential groove in an outer edge of the valve member, the outer edge of the valve member which is concentric with and proximate to the wall of the accumulator cavity. Four channels are located on a conical-shaped head portion of the valve member proximate to the circumferential groove.

12 Claims, 4 Drawing Sheets

FLOW REGULATING ASSEMBLY FOR A PLASTIC INJECTION MACHINE

BACKGROUND OF THE INVENTION

This invention relates to plastic injection machines, and, more particularly, to a flow regulating assembly for restricting plastic material from flowing directly into an accumulator cavity of a plastic injection machine and instead directing the plastic material towards the wall of the accumulator cavity thereby providing a scouring effect and reducing the build-up of the plastic material on the wall of the accumulator cavity.

Center feed plastic injection machines are known in the art in which plastic material is allowed to flow through a central cavity of an injection piston and into an accumulator cavity, prior to displacement of the plastic material by the injection piston through an injection nozzle and into a mold unit. In these devices, the plastic material flows directly into the accumulator cavity.

The problem with direct flow of the plastic material from the central cavity of the injection piston to the central portion of the accumulator cavity is that this results in uneven flow. Furthermore, when the plastic material flows directly into the central portion of the accumulator cavity, this leaves a certain amount of area on either side of the central chamber/accumulator cavity interface where the plastic material does not flow. These areas are commonly known as "dead corners" where stagnant plastic material can build-up and effect the plastic injection process. After a certain amount of build-up, the accumulator cavity must be cleaned to remove this hardened plastic material which is labor intensive and time consuming resulting in high cost over time. Producing a more even continuous flow during the process and reducing the labor and time involved in removing the build-up plastic material is, accordingly, desirable.

The difficulties in the prior art plastic injection systems are substantially eliminated by the present invention.

SUMMARY OF THE INVENTION

Accordingly, it is an object of the present invention to provide means for reducing the build-up of plastic material on the accumulator cavity of a plastic injection machine.

It is another object of the present invention to provide a flow regulating assembly which will result in a more even continuous flow of plastic material into an accumulator cavity of a plastic injection machine.

It is still another object of the present invention to provide a flow regulating assembly for restricting plastic material from flowing directly into an accumulator cavity of a plastic injection machine.

A further object of the present invention is to provide a flow regulating assembly for directing the plastic material towards the wall of an accumulator cavity thereby reducing build-up of the plastic material on the wall of the accumulator cavity.

Yet another object of the present invention is to provide a flow regulating assembly for an accumulator cavity which will require less of the time consuming and labor intensive cleaning than the prior art.

These and other objects of the invention will become apparent upon reference to the following specification, drawings, and claims.

The present invention is a flow regulating assembly for restricting plastic material from flowing directly from a central chamber of an injection piston or other plastic material delivery means to an accumulator cavity of a plastic injection machine and instead directing the plastic material towards the walls of the accumulator cavity thereby providing a scouring effect and reducing build-up of the plastic material on the walls of the accumulator cavity. The flow regulating assembly comprises a valve member which includes a central opening for receiving the plastic material therein, the central opening which is located proximate to and in corresponding alignment with the central chamber of the plastic material delivery means. At least two branch passageways in the valve member are extended from the central opening to external openings in an outer edge of the valve member, the outer edge of the valve member which is concentric with and proximate to the wall of the accumulator cavity. Accordingly, during accumulation, the plastic material is directed through the central opening and the branch passageways to the outer edge of the valve member. The plastic material then flows into the accumulator cavity along the wall thereof rather than directly into the central portion of the accumulator cavity as in the prior art.

DETAILED DESCRIPTION OF THE INVENTION

In the Figures, a plastic injection machine shown generally at 10 is illustrated wherein a flow regulating assembly shown generally at 12 restricts a plastic material from flowing directly into a substantially cylindrical-shaped accumulator cavity 14 of an injection barrel 16 and instead directs the plastic material towards the wall 18 of the accumulator cavity 14 during injection thereby providing a scouring effect and reducing build-up of the plastic material on the wall 18 of the accumulator cavity 14.

Figure 1:
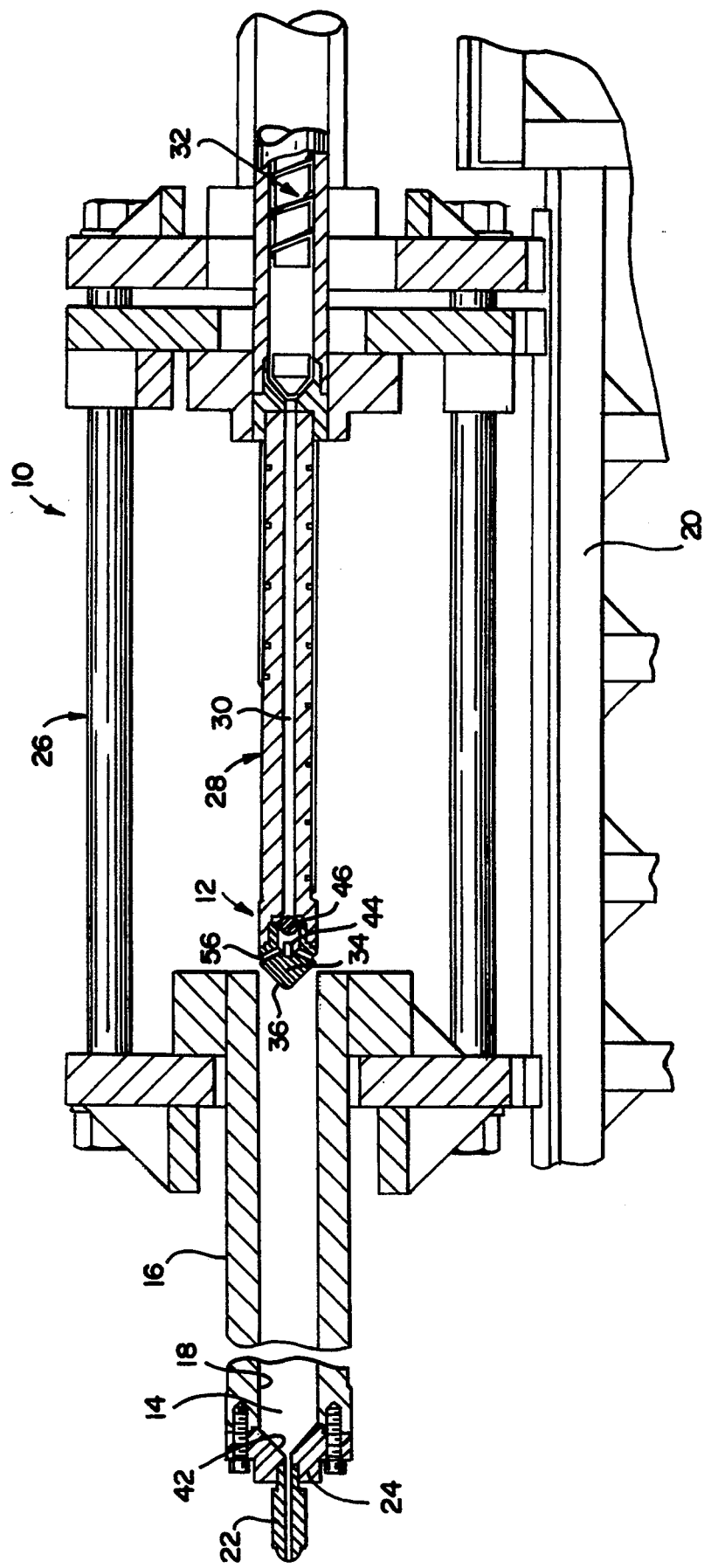
FIG. 1 is an elevation of the plastic injection machine showing an injection piston withdrawn from an injection barrel and particularly showing the flow regulating assembly of the present invention.

The plastic injection machine 10 is supported by an elongated main frame 20. A nozzle unit 22 is mounted to an end cap 24 at what will be referred to as the forward end of the injection barrel 16 which is supported on the forward end of a carriage 26. An injection piston assembly 28 moves slidably along the carriage 26 and is telescopically received within the accumulator cavity 14 of the injection barrel 16. The injection piston assembly 28 is shown withdrawn from the accumulator cavity 14 in FIG. 1 and is shown fully received within the accumulator cavity 14 in FIG. 2. The plastic material is supplied to a central chamber 30 of the injection piston assembly 28 by a screw assembly 32.

Figure 2:
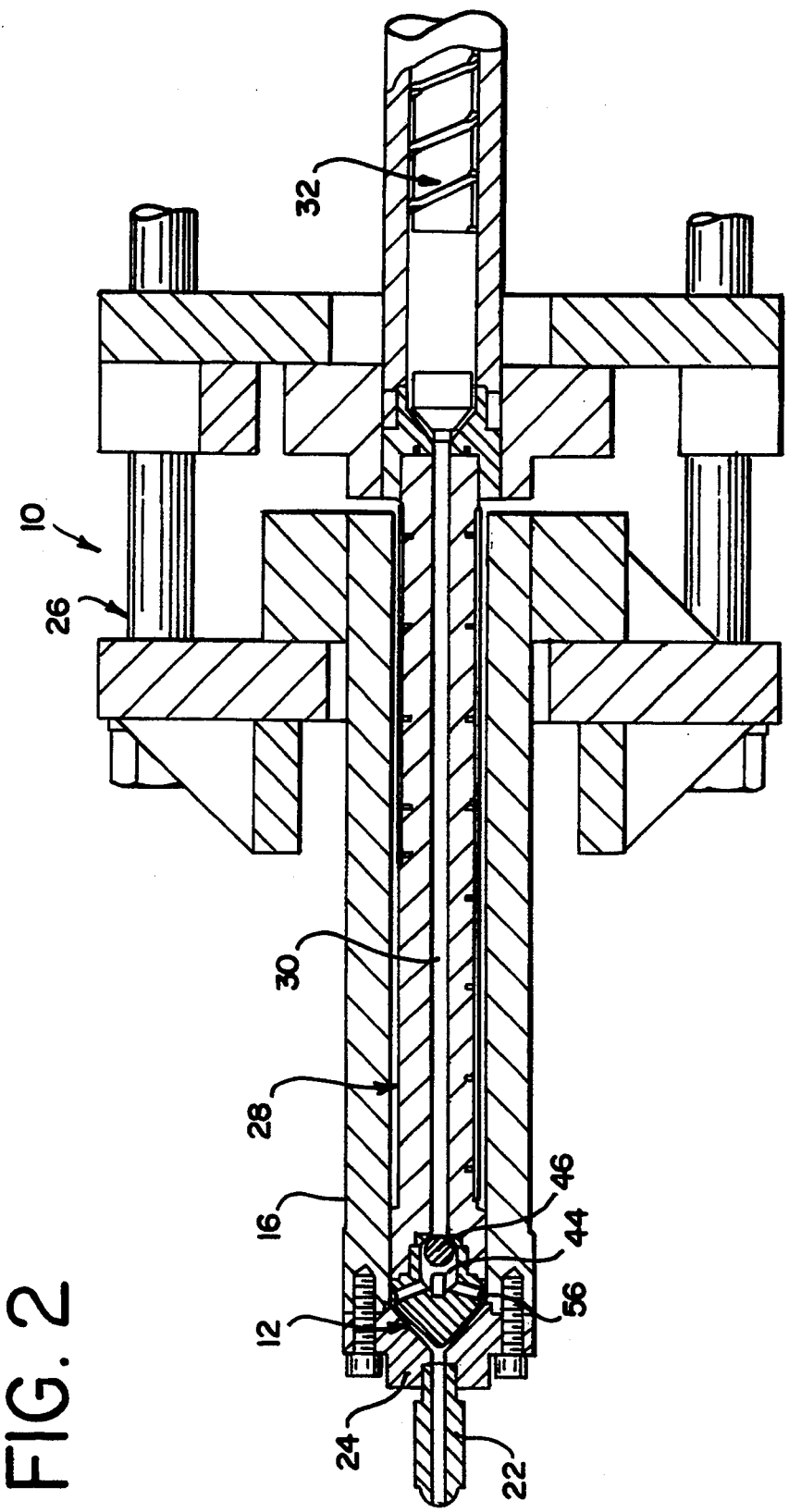
FIG. 2 is an elevation of the plastic injection machine of FIG. 1 with the injection piston received within the injection barrel.
Figure 3:
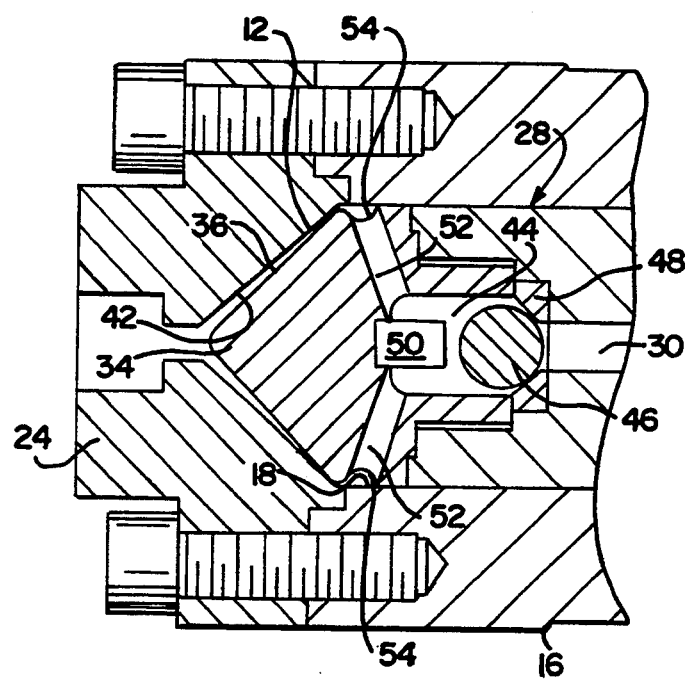
FIG. 3 is an enlarged detail of the flow regulating assembly, shown partially in section.
Figure 4:
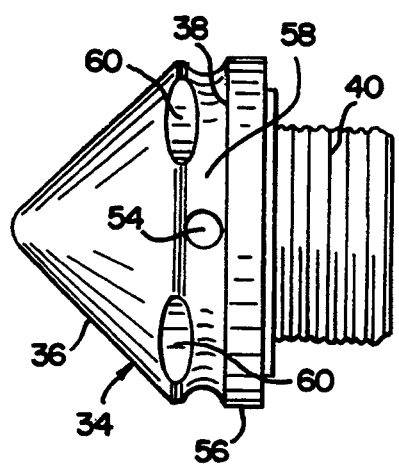
FIG. 4 is a side elevation of the valve member of the invention.
Figure 5:
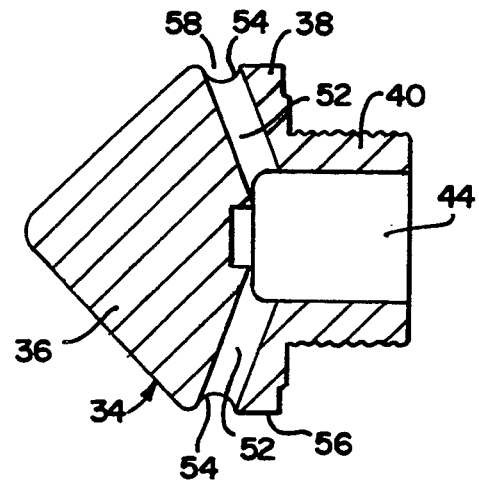
FIG. 5 is a cross section of the valve member shown in FIG. 4.
Figure 6:
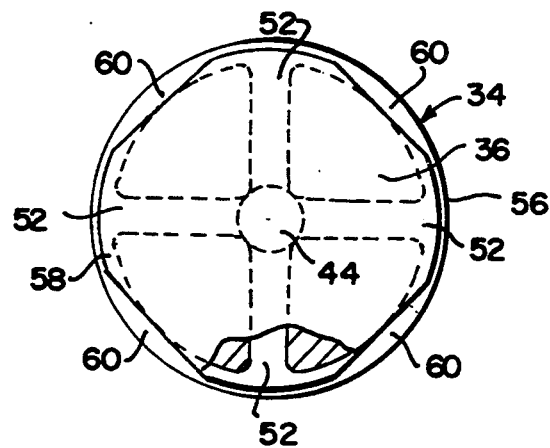
FIG. 6 is an end view of the valve member shown in FIG. 4, partially in section.

During accumulation, the plastic material is fed into the accumulator cavity 14 through the injection piston assembly 28 which is initially positioned as shown in FIG. 2. As the plastic material accumulates in the accumulator cavity 14, the injection piston assembly 28 is forced backwardly towards the position just short of that shown in FIG. 1. The injection piston assembly 28 is then forced forwardly during injection to displace the plastic material which has accumulated in the accumulator cavity 14 through the nozzle unit 22 and into a mold unit (shown shown).

The flow regulating assembly 12 is located at the forward end of the injection piston assembly 28 and includes a valve member 34 comprising a conical head portion 36, a substantially cylindrical central portion 38, and a threaded tail portion 40 for attachment to the forward end of the injection piston assembly 28. The conical shape of the head portion 36 is designed for fitment within a corresponding shaped seat 42 in the end cap 24 in order to displace the maximum amount of plastic material in the accumulator cavity 14.

The threaded tail portion 40 of the valve member 34 includes a central opening 44 which is located proximate to and in corresponding alignment with the central chamber 30 of the injection piston assembly 28. The central opening 44 is substantially cylindrical and extends from the central chamber 30 to the substantially cylindrical central portion 38 of the valve member 34. Located within the central opening 44 is a ball member 46 which, during injection, is biased by the back pressure from the accumulator cavity into a ball seat 48 against the central chamber 30 of the injection piston assembly 28 in order to block the flow of the plastic material during injection. The ball member 46 is movable away from the ball seat 48 by the plastic material during accumulation thus allowing for the flow of the plastic material from the central chamber 30 of the injection piston assembly 28, around the ball member 46 and to the central opening 44 of the valve member 34. A ball stop 50 limits the movement of the ball member 46 away from the ball seat 48.

The central opening 44 extends into the substantially cylindrical central portion 38 of the valve member 34 where it is divided into four branch passageways 52, each of which extends forwardly at an angle from the central opening 44 to an outer opening 54 in an outer edge 56 of the valve member 34. The outer edge 56 of the valve member 34 is concentric with and proximate to the cavity wall 18 of the accumulator cavity 14. A circumferential groove 58 is located about the substantially cylindrical central portion 38 of the valve member 34 proximate to the conical head portion 36 of the valve member 34. It is within the circumferential groove 58 that the outer openings 54 of the branch passageways 52 are located. An external opening 54 of a branch passageway 52 is positioned every. 90° along the circumferential groove 58.

The conical head portion 36 of the valve member 34 also includes four channels 60 proximate to the circumferential groove 58 and in a spaced linear relationship offset from the external openings 54 of the branch passageways 52 along the circumferential groove 58. One channel 60 is located between two consecutive external openings 54 of the branch passageways 52.

Figure 7:
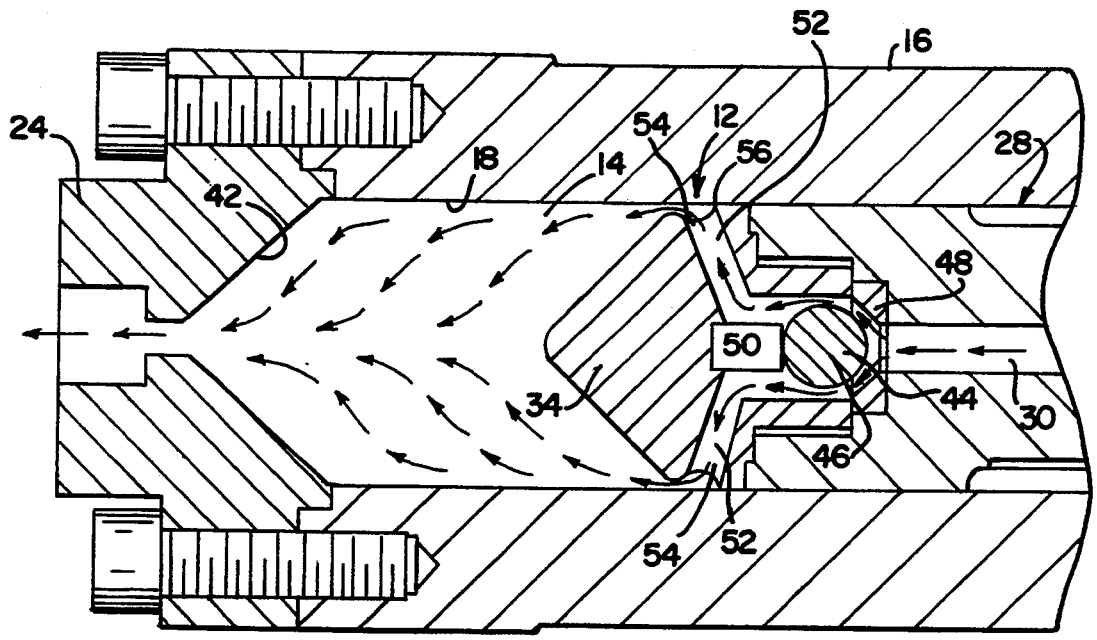
FIG. 7 is a side elevation of the flow regulating assembly of FIG. 3, particularly showing the flow of the plastic material therethrough.
Figure 8:
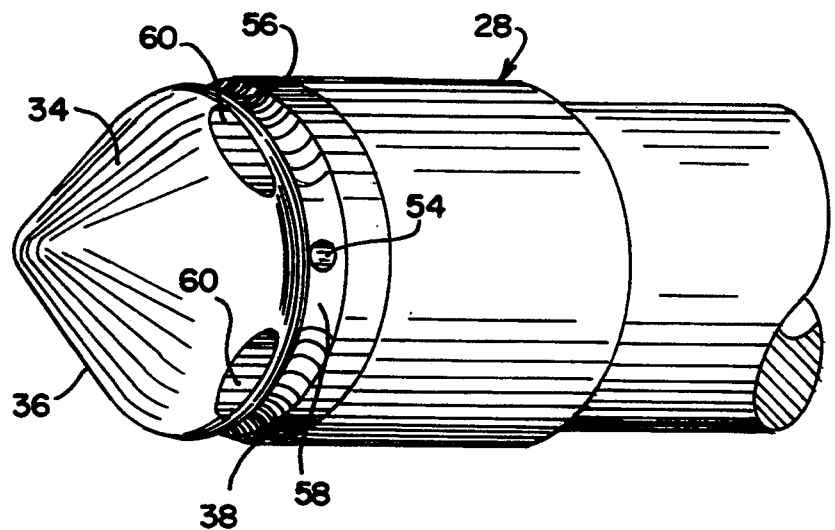
FIG. 8 is a perspective view of the valve member which is shown attached to the injection piston.

Accordingly, as shown in FIG. 7, during the accumulation of plastic material, the plastic material is forced from the screw assembly 32 through the central chamber 30 of the injection piston assembly 28 and to the flow regulating assembly 12. The plastic material forces the ball member 46 from the ball seat 48 and flows around the ball member 46 into the central opening 44 of the threaded tail portion 40 of the valve member 34. The plastic material then flows into the four branch passageways 52 to the external openings 54. At this point, the plastic material flows from each of the external openings 54 into the circumferential groove 58 until it reaches an area of least resistance at the closest channel 60. Finally, the plastic material flows into the channels 60 which are proximate the wall 18 of the accumulator cavity 14 and into the accumulator cavity 14 for subsequent injection through the nozzle unit 22 into a mold unit (not shown).

Therefore, since the plastic material enters the accumulator cavity 14 at the cavity wall 18, a continuous even flow over the conical head portion 36 of the valve member 34 eliminates any dead corners where the plastic material could build-up and harden prematurely.

The foregoing description and drawings merely explain and illustrate the invention and the invention is not limited thereto, except insofar as the claims are so limited, as those skilled in the art who have the disclosure before them will be able to make modifications and variations therein without departing from the scope of the invention. For example, it is contemplated that any combination of branch passageways 52 and channels 60 may be used to direct the plastic material to the wall 18 of the accumulator cavity 14.

I claim:

1. A flow regulating assembly for restricting plastic material from flowing directly into an accumulator cavity of a plastic injection machine and instead directing said plastic material towards the wall of said accumulator cavity thereby providing a scouring effect and reducing build-up of said plastic material on said wall of said accumulator cavity, said regulating assembly comprising:

(a) means for delivering said plastic material to said accumulator cavity, said plastic material delivery means having a central chamber therein for the flow of said plastic material therethrough;

(b) a valve member located between said plastic material delivery means and said accumulator cavity, said valve member which blocks said plastic material from flowing directly from said plastic material delivery means into said accumulator cavity;

(c) a central opening in said valve member for receiving said plastic material therein, said central opening located proximate to and in corresponding alignment with said central chamber of said plastic material delivery means;

(d) at least two branch passageways extended from said central opening to external openings in an outer edge of said valve member, said outer edge of said valve member which is concentric with and proximate to said wall of said accumulator cavity, said branch passageways allowing for the flow of said plastic material from said central opening to said outer edge of said valve member; and (e) said at least two branch passageways leading to a circumferential groove in said outer edge of said valve member, said circumferential groove directing the flow of said plastic material circumferentially between said outer edge of said valve member and said wall of said accumulator cavity.

2. The flow regulating assembly of claim 1, further comprising a ball member which, during injection, is biased in a seated position against said central chamber of said plastic material delivery means for blocking the flow of said plastic material from said plastic material delivery means, said ball member which is movable, during accumulation, to an unseated position away from said central chamber of said plastic material delivery means, said ball member, when in said unseated position allowing for the flow of said plastic material from said plastic material delivery means, around said ball member and to said central opening of said valve member.

3. The flow regulating assembly of claim 1 wherein said valve member further comprises a substantially conical-shaped head portion proximate to said circumferential groove, said conical-shaped head portion for fitment within a corresponding shaped seat in an end cap member, said end cap member which is located between said accumulator cavity and an injection nozzle member.

4. The flow regulating assembly of claim 3 wherein said valve member further comprises at least two channels located on said conical-shaped head portion proximate to said circumferential groove allowing for the flow of said plastic material from said circumferential groove to said accumulator cavity.

5. The flow regulating assembly of claim 4 wherein said channels are located in a spaced linear relationship offset from said external openings of said branch passageways along said circumferential groove.

6. The flow regulating assembly of claim 4 wherein said valve member comprises four of said branch passageways having external openings which are positioned every 90° along said outer edge of said valve member.

7. The flow regulating assembly of claim 6 wherein said valve member comprises four of said channels, each of said channels located between two consecutive said external openings of said branch passageways.

8. A flow regulating assembly for restricting plastic material from flowing directly from a central chamber of plastic material delivery means to an accumulator cavity of a plastic injection machine and instead directing said plastic material towards the wall of said accumulator cavity thereby providing a scouring effect and reducing build-up of said plastic material on said wall of said accumulator cavity, said flow regulating assembly comprising:

(a) a valve member having a substantially conical-shaped head portion, a substantially cylindrical-shaped central portion, and a tail portion, said valve member located between said plastic material delivery means and said accumulator cavity;

(b) a central opening in said tail portion of said valve member for receiving said plastic material therein, said central opening located proximate to and in corresponding alignment with said central chamber of said plastic material delivery means;

(c) at least two branch passageways in said central portion of said valve member, said branch passageways extended from said central opening in said tail portion of said valve member to external openings in a circumferential groove in an outer edge of said valve member, said outer edge of said valve member which is concentric with and proximate to said wall of said accumulator cavity; and (d) at least two channels located on said conical-shaped head portion of said valve member proximate to said circumferential groove of said central portion of said valve member.

9. The flow regulating assembly of claim 8 further comprising a ball member which, during injection, is biased in a seated position against said central chamber of said plastic material delivery means for blocking the flow of said plastic material from said plastic material delivery means, said ball member which is movable, during accumulation, to an unseated position away from said central chamber of said plastic material delivery means, said ball member, when in said unseated position allowing for the flow of said plastic material from said plastic material delivery means, around said ball member and to said central opening in said tail portion of said valve member.

10. The flow regulating assembly of claim 8 wherein said channels are located in a spaced linear relationship offset from said external openings of said branch passageways along said circumferential groove.

11. The flow regulating assembly of claim 8 wherein said valve member comprises four of said branch passageways having external openings which are positioned every 90° along said circumferential groove.

12. The flow regulating assembly of claim 11 wherein said valve member comprises four of said channels, each of said channels located between two consecutive said external openings of said branch passageways.

* * * * *